United States Patent [19]

Ogino et al.

[11] Patent Number: 5,343,014

[45] Date of Patent: Aug. 30, 1994

[54] METHOD OF WELDING METALS OF DIFFERENT KIND BY LASER

[75] Inventors: Akihiko Ogino, Chita; Yoshiyuki Miyase; Shuuzi Sakou, both of Okazaki; Shinzi Shibata, Toyota, all of Japan

[73] Assignee: Nippondenso Co., Ltd., Kariya, Japan

[21] Appl. No.: 838,304

[22] PCT Filed: Jul. 8, 1991

[86] PCT No.: PCT/JP91/00913

§ 371 Date: Mar. 12, 1992

§ 102(e) Date: Mar. 12, 1992

[87] PCT Pub. No.: WO92/00828

PCT Pub. Date: Jan. 23, 1992

[30] Foreign Application Priority Data

Jul. 12, 1990 [JP] Japan .................................. 2-184686
Apr. 19, 1991 [JP] Japan .................................. 3-088793

[51] Int. Cl.$^5$ ............................................. B23K 26/00
[52] U.S. Cl. ................................. 219/121.64; 219/118
[58] Field of Search ................... 219/121.63, 121.64, 219/121.12, 121.13, 118

[56] References Cited

U.S. PATENT DOCUMENTS

| | | | |
|---|---|---|---|
| 4,642,446 | 2/1987 | Pennington | 219/121.64 |
| 4,682,002 | 7/1987 | Piane et al. | 219/121.64 |
| 4,684,779 | 8/1987 | Berlinger et al. | 219/121.64 |
| 4,697,061 | 9/1987 | Spater et al. | 219/121.64 |
| 5,142,119 | 8/1992 | Hillman et al. | 219/121.64 |
| 5,164,566 | 11/1992 | Spletter et al. | 219/121.63 |

FOREIGN PATENT DOCUMENTS

| | | |
|---|---|---|
| 0283003 | 9/1988 | European Pat. Off. . |
| 50-160148 | 12/1975 | Japan . |
| 58-65592 | 4/1983 | Japan . |
| 60-152390 | 8/1985 | Japan . |
| 60-40958 | 9/1985 | Japan . |
| 219421 | 1/1990 | Japan . |
| 371991 | 3/1991 | Japan . |
| 3106582 | 5/1991 | Japan . |

*Primary Examiner*—C. L. Albritton
*Attorney, Agent, or Firm*—Cushman, Darby & Cushman

[57] ABSTRACT

The present invention is to provide a method for laser welding different kinds of metals by which at least two types of metal members having mutually different laser reflection factor, are put one upon another and welded when the metal members are irradiated with lasers emitted in the superposed direction, comprising a process to put the first metal member on the second metal member, wherein the first metal member has a first laser reflection factor and the second metal member has a second laser reflection factor which is lower than that of the aforementioned first laser reflection factor, and the first and the second metal member are put one upon another through a metal layer and when irradiated with lasers, the aforementioned metal layer is more difficult to melt than the aforementioned second metal member. The method of the present invention further comprises a process in which lasers are irradiated from the aforementioned first metal member side. According to the aforementioned method, laser output which is sufficiently high to melt the first metal member having a high laser reflection factor, is irradiated from the first metal member side, so that this laser output is excessively high to melt the second metal member. However, the aforementioned metal layer acts as if it inhibits the laser input to the second metal member. Accordingly, abrupt laser input into the second metal member can be avoided, and the occurrence of scatter of the metal can be prevented so that an excellent joint condition can be obtained.

11 Claims, 8 Drawing Sheets

| METAL | LASER REFLECTION FACTOR (%) | LASER ABSORPTION FACTOR (%) | MELTING POINT (°C) |
|---|---|---|---|
| COPPER | 86 | 14 | 1083 |
| IRON | 65 | 35 | 1539 |
| BRASS | 70 | 30 | 920 |
| TIN | 62 | 38 | 232 |
| NICKEL | 70 | 30 | 1453 |
| PHOSPHOR-NICKEL | 70 | 30 | 1000 |

METHOD OF WELDING METALS OF DIFFERENT KIND BY LASER

FIELD OF TECHNOLOGY

The present invention relates to a method of welding metal members of different kind in such a manner that different kinds of metal members are put on each other and lasers are irradiated from the side of one of the metal members.

BACKGROUND TECHNOLOGY

Recently, laser beam machining has been also applied to the field of welding. Since laser beam machining is conducted by a heat source of extremely high energy density, thermal effect is small in the portions other than a portion irradiated with lasers, so that minute portions or parts required high accuracy can be welded under the condition of low strain. Further, lasers not attenuate in atmosphere, and generates no X-rays. Therefore, laser welding can be conducted in atmosphere, and there is no restriction on the shape and size of members to be welded.

Figure 7A:
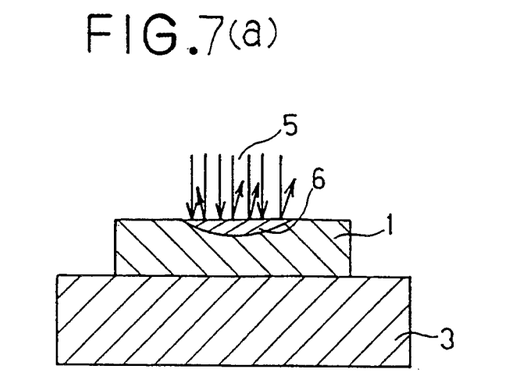
Figure 7B:
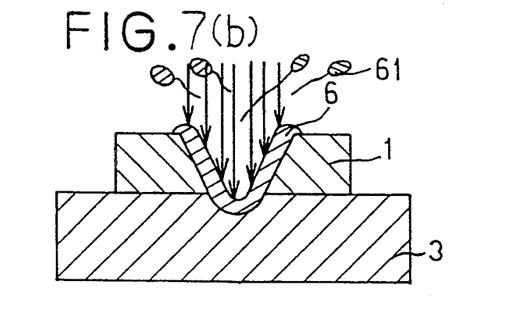
Figure 7C:
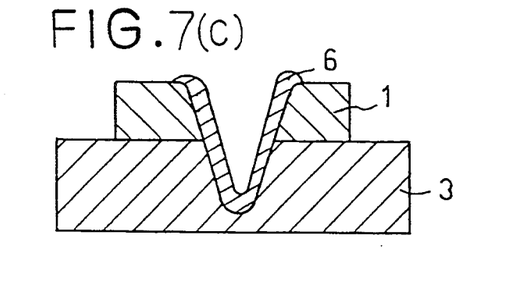
Figure 7D:
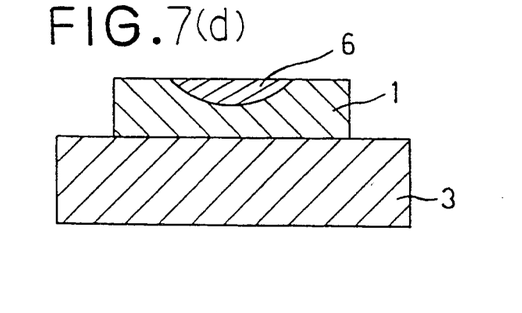
Figure 8:
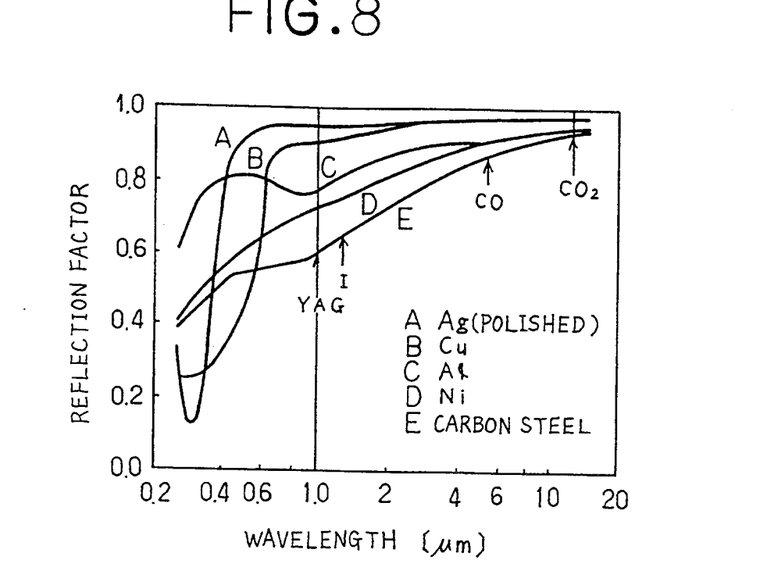
FIG. 8 is a characteristic diagram showing the laser reflection characteristics of various metals.

However, as shown in FIGS. 7(a)–7(d), when a copper member 1 was put on an iron member 3 and the copper member 1 was irradiated with lasers 5 to weld the copper member 1 and the iron member 3, the copper member 1 melted first as shown in FIG. 7(a), and melting of the copper member 1 progressed as shown in FIG. 7(b). When the melting zone of copper member 1 had reached the iron member 3, a portion of the iron member 3 irradiated with lasers 5, was scattered. Accordingly, a hole was formed in the members as shown in FIG. 7(c). In the drawings, numeral 6 is a metal layer which was melted by lasers, and numeral 61 is a metal particle which was scattered.

In order to prevent the iron member 3 from scattering, laser input (referred to as laser irradiating power, hereinafter) was reduced. Then, a problem arose in which the copper member 1 did sufficiently melt so that welding could not be conducted.

The inventors earnestly investigated the cause of the aforementioned problem. As a result, they found that the cause was the laser reflection factor of each metal member to be welded.

It is a primary object of the present invention to positively weld different kinds of metals, paying attention to the laser reflection factor.

DISCLOSURE OF THE INVENTION

In order to accomplish the aforementioned object, the method of welding metals of different kind by laser according to the present invention is a method of welding at least two kinds of metal members, the laser reflection factors of which are different from each other, in such a manner that the metal members are put one upon another and irradiated with lasers which are emitted in the direction perpendicular to the surface of the metal members. The welding method of the present invention comprises a process in which the first metal member is put on the second metal member. In the aforementioned process, the first metal member has the first laser reflection factor, and the second metal member has the second laser reflection factor which is lower than the aforementioned first laser reflection factor. The first and the second metal member are put one upon another through a metal layer. When irradiated with lasers, said metal layer is more difficult to melt than the aforementioned second metal member. The welding method of the present invention further comprises a process in which lasers are irradiated from the side of the aforementioned first metal member.

As the first embodiment, the aforementioned metal layer has a laser reflection factor which is approximately the same as that of the second metal member, and is made of a metal having a melting point higher than that of the second metal member. As the second embodiment, the metal layer is made of a metal having a laser reflection factor, of a value which is between the laser reflection factor of the first metal member and that of the second metal member.

That is, the first metal member, the laser reflection factor of which is higher than that of the second metal member, is irradiated with lasers emitted on the first metal member side which can melt the first metal member. Consequently, the laser output is sufficiently high to melt the second metal member. However, according to the aforementioned method, the metal layer acts as if preventing the lasers from being inputted to the second metal member, so that the lasers are not sharply inputted to the second metal member, and the occurrence of metal scatter can be prevented so that excellent welding can be performed.

That is, according to the aforementioned first embodiment, the fact that the laser reflection factor of the metal layer is approximately the same as that of the second metal member, and the melting point of the metal layer is higher than that of the second metal member, act synergistically, so that the heat generated by the lasers is consumed by the metal layer and the progress of melting of the second metal member is inhibited. Therefore, laser energy can be prevented from being abruptly inputted into the second metal member.

According to the second embodiment, the metal layer disposed between the first and the second metal member has a higher laser reflection factor than the second metal member, so that the metal layer gradually absorbs laser energy, and progress of melting can be inhibited by the metal layer. Therefore, laser energy can be prevented from being abruptly inputted into the second metal member.

As mentioned above, the present invention provides excellent effects in that the first and the second metal member can be securely welded without causing damage to the metal members.

BRIEF DESCRIPTION OF THE DRAWINGS

FIGS. 3(a–c) are sectional views showing the process of welding of each portion irradiated with lasers;

FIGS. 6(a–c) are sectional views showing another embodiment;

FIGS. 7(a–d) are sectional views showing a conventional welding process;

PREFERRED EMBODIMENTS TO EXECUTE THE INVENTION

Referring to the attached drawings, the embodiments of the present invention will be explained as follows.

FIRST EMBODIMENT

Figure 12:
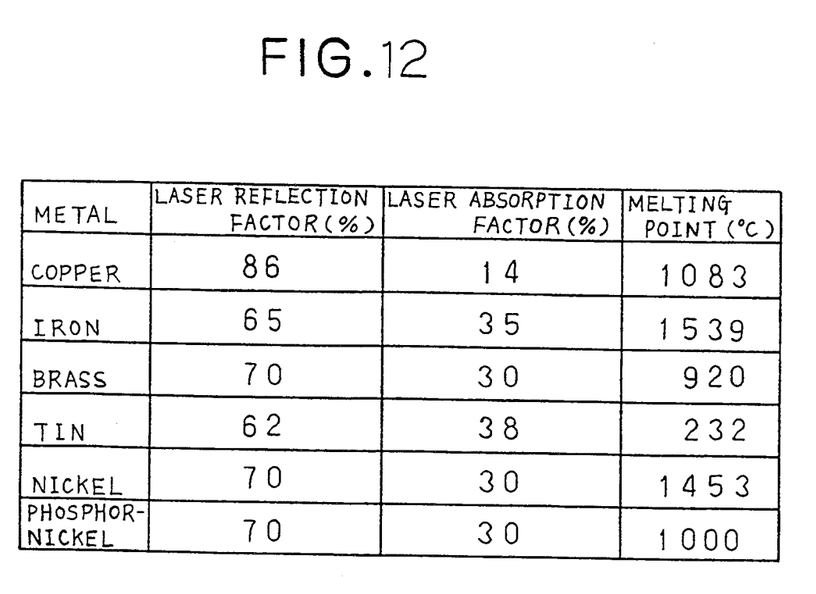
FIG. 12 is a drawing which shows laser reflection factors and laser absorption coefficients of various metals, and also the melting points of various metals with regard to YAG lasers of a predetermined wavelength.

Lasers utilized in this embodiment are YAG lasers. Laser reflection factors and laser absorption factors and melting points of various metals with regard to YAG lasers of a predetermined wavelength, are shown in FIG. 12.

Figure 1:
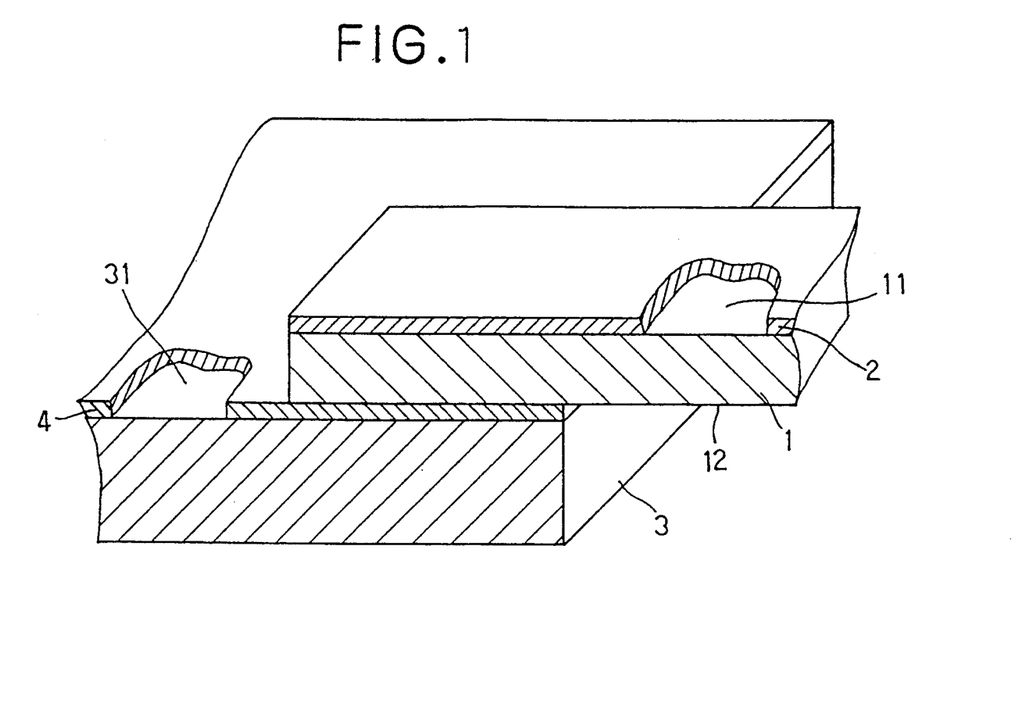
FIG. 1 is a perspective view showing the circumstances in which the first and the second metal member are put one upon another.
Figure 2:
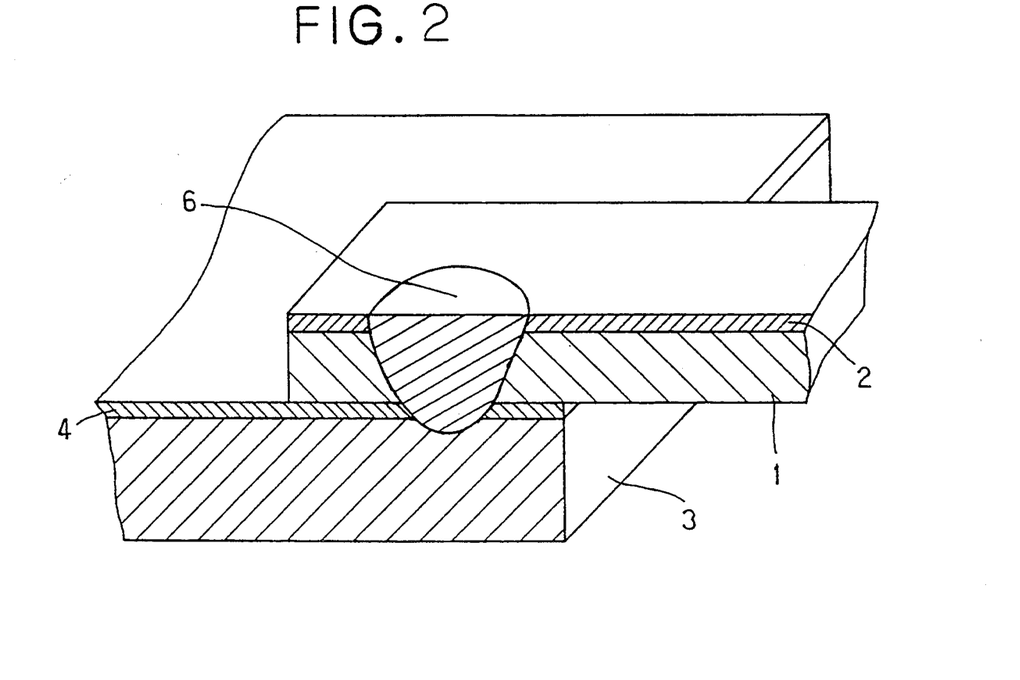
FIG. 2 is a partially sectional perspective view showing a joined condition when laser welding has been performed.

FIG. 1 is a view showing the first and the second metal member are put one upon another. The first metal member 1 is a lead made of copper having the first laser reflection factor (86%), and includes the first surface 11 and the second surface 12 which are opposed to each other. Numeral 2 is a metal layer made of tin having laser reflection factor 62% which is lower than that of the copper lead 1. This tin layer 2 is formed on the first surface 11 of the copper lead 1 by means of plating or coating, the thickness of which is 1–10 μm.

The second metal member 3 is a terminal made of brass having the second laser reflection factor (70%) which is lower that that of the copper lead 1. Numeral 4 is a metal layer made of an alloy of phosphor and nickel, the laser reflection factor 70% of which is the same as that of the terminal 3 made of brass. This phosphor-nickel layer 4 is formed on a surface 31 of the terminal 3 made of brass by plating or coating and the thickness is 1–10 μm. As described above, difference between the laser reflection factor of the copper lead 1 and that of the tin layer 2 is set to be large, and the melting point 1000° C. of the phosphor-nickel layer 4 is set between the melting point 1083° C. of the copper lead 1 and that (920° C.) of the terminal 3 made of brass.

And as the first process, the second surface 12 of the copper lead 1, the first surface 11 of which is provided with the tin layer 2, is put on the surface 31 of the brass terminal 3 which is provided with the phosphor-nickel layer 4. Next as the second process, lasers from the surface of the tin layer 2 (the copper lead 1 side) is irradiated. Here, lasers 5 are emitted from a laser unit not shown in the drawing as is commonly known, and pass through a reflection mirror and a condenser lens not shown, and enter into the tin layer 2 provided on the copper lead 1.

Figures 3A, 3B, 3C:
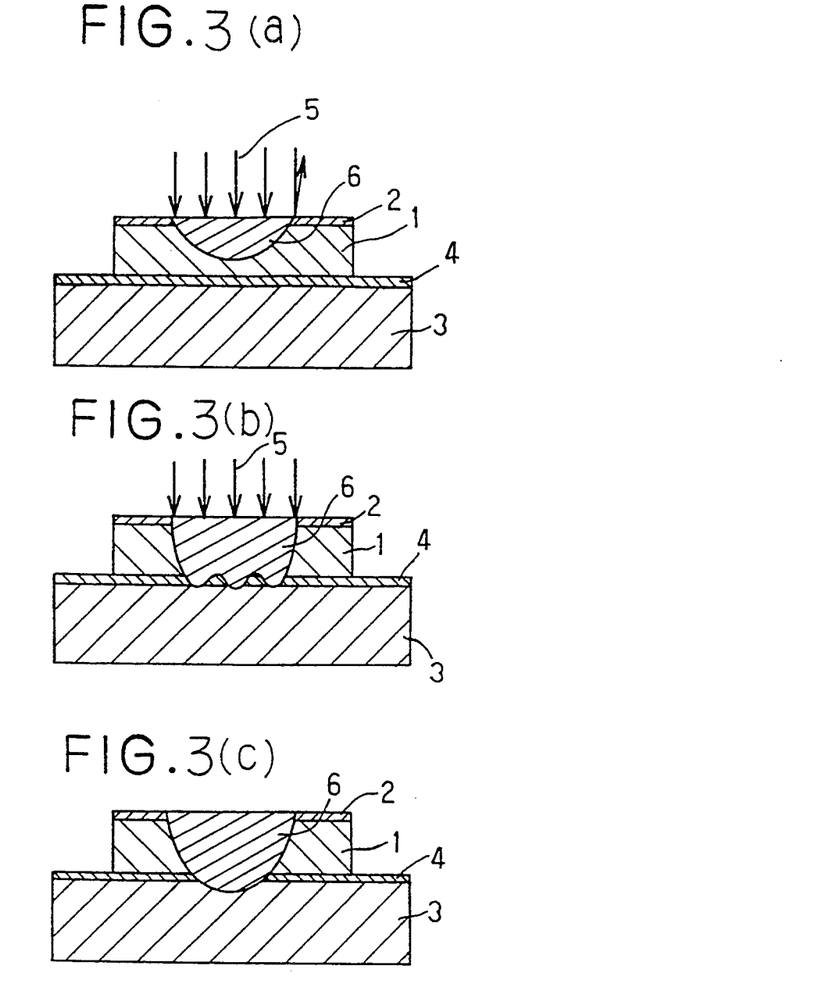

Next, referring to FIGS. 3(a)–(c), behavior of laser welding in the aforementioned first embodiment will be explained, including the state of welding of each metal.

The laser reflection factor of the tin layer 2 is lower than that of the copper lead 1, so that in this case, the lead 1 of copper can be melted together with the tin layer 2 by lower laser input as compared with a case in which only the lead 1 of copper is melted. Therefore, the layer 2 is irradiated with this low laser input. When the tin layer 2 is irradiated with lasers, it melts, and the melted tin forms an alloy with copper of the lead 1. Increasing at the same time, the temperature of the lead 1 of copper by the action of lasers. Due to the synergetic effect of the formation of alloy by the tin melting into the lead 1 and increase in temperature, lasers are actively absorbed by the lead 1 of copper. Therefore, the surface of the lead 1 of copper starts to melt. As melting progresses as shown in FIG. 3(a) and temperature rises, the reflection factor of the lead 1 of copper is reduced, so that the melting further progresses.

When this melting progresses up to the phosphor-nickel layer 4, the following facts of the laser reflection factor of the phosphor-nickel layer 4 being approximately the same as that of the terminal 3 of brass; and the melting point of the layer 4 of phosphor-nickel being higher than that of the terminal 3 of brass synergistically acts to melt the phosphor-nickel layer 4, by consuming heat generated by lasers, so that the terminal 3 of brass is inhibited from being melted abruptly. Accordingly, the laser irradiating effect on the terminal 3 of brass is reduced, and scatter of the terminal 3 of brass can be prevented. Therefore, an excellent joint condition shown in FIG. 3(c) can be obtained.

In the aforementioned case, the laser reflection factor of the phosphor-nickel layer 4 and that of the terminal 3 of brass are approximately the same. However an excellent joint condition is obtained since the melting point of the phosphor-nickel layer 4 is higher than that of the terminal 3 of brass.

As a variation, when welding is conducted under the condition that both the lead 1 of copper and the terminal 3 of brass are coated with a phosphor-nickel layer, sufficient joint strength can not be obtained since the wetting property of phosphor-nickel is not good. When welding is conducted under the condition that both the copper lead 1 and the brass terminal 3 are coated with a tin layer, laser input to the terminal 3 of brass becomes abrupt, so that the abrupt melting of terminal 3 of brass generates gas and expansion. Resulting, in scattering of the melted metal there around. Because of the aforementioned reasons, an excellent joint can be obtained when combined with the first embodiment mentioned before.

SECOND EMBODIMENT

The same effect as that of the first embodiment can be provided by the second embodiment in which: the second metal member is composed of a terminal 3 made of iron (the melting point of which is 1539° C.) having a laser reflection factor of 65%; and a nickel layer 4 (the melting point of which is 1453° C.) having the laser reflection factor 70% which is between the laser reflection factor of the copper lead 1 and that of the terminal 3 of iron, is provided for the metal layer to be formed on a surface 31 of the terminal 3 of iron. In this case, the difference between the laser reflection factor of the lead 1 of copper and that of the layer 2 of tin, is set to be larger than the difference between the laser reflection factor of the terminal 3 of iron and that of the layer 4 of nickel.

According to the structure of the second embodiment, when the layer 2 of tin is irradiated with lasers, melting of the lead 1 of copper progresses in the same manner as the first embodiment. When the melting progresses up to the layer 4 of nickel, the lasers are gradually absorbed by the layer 4 of nickel since the reflection factor of the layer 4 of nickel is higher than that of the terminal 3 of iron, so that the progress of melting is inhibited. Therefore, the terminal 3 of iron is prevented from being abruptly irradiated with lasers. Consequently, scatter of the iron terminal 3 can be prevented, and an excellent joint shown in FIG. 3(c) can be obtained.

From the foregoing, the relation between the second metal member and the metal layer which acts to prevent irradiation of lasers on the second metal member, will be described as follows:

In the first embodiment, when the laser reflection factor of the second metal member and that of the metal layer were approximately the same, and when the melting point of the metal layer was higher than that of the metal member, an excellent joint condition could be obtained. On the other hand, in the second embodiment, when the melting point of the layer 4 of nickel was lower than that of the terminal 3 which formed the second metal member, and when the laser reflection factor of the layer 4 of nickel was higher than that of the terminal 3 of iron, an excellent joint condition could be obtained. Therefore, it is necessary to consider both the reflection factor and melting point of the metal layer and the second metal member.

According to the second embodiment, the nickel layer 4 functions as a thermal buffer layer and always stops the progress of penetration at a position close to the boundary between the lead 1 and the terminal 3. Due to is action, a trace amount of material of the terminal 3 can be made stably contained in the material of the lead 1. Accordingly, the occurrence of cracks caused in a welded portion by an excessive depth of penetration can be eliminated.

Figure 5:
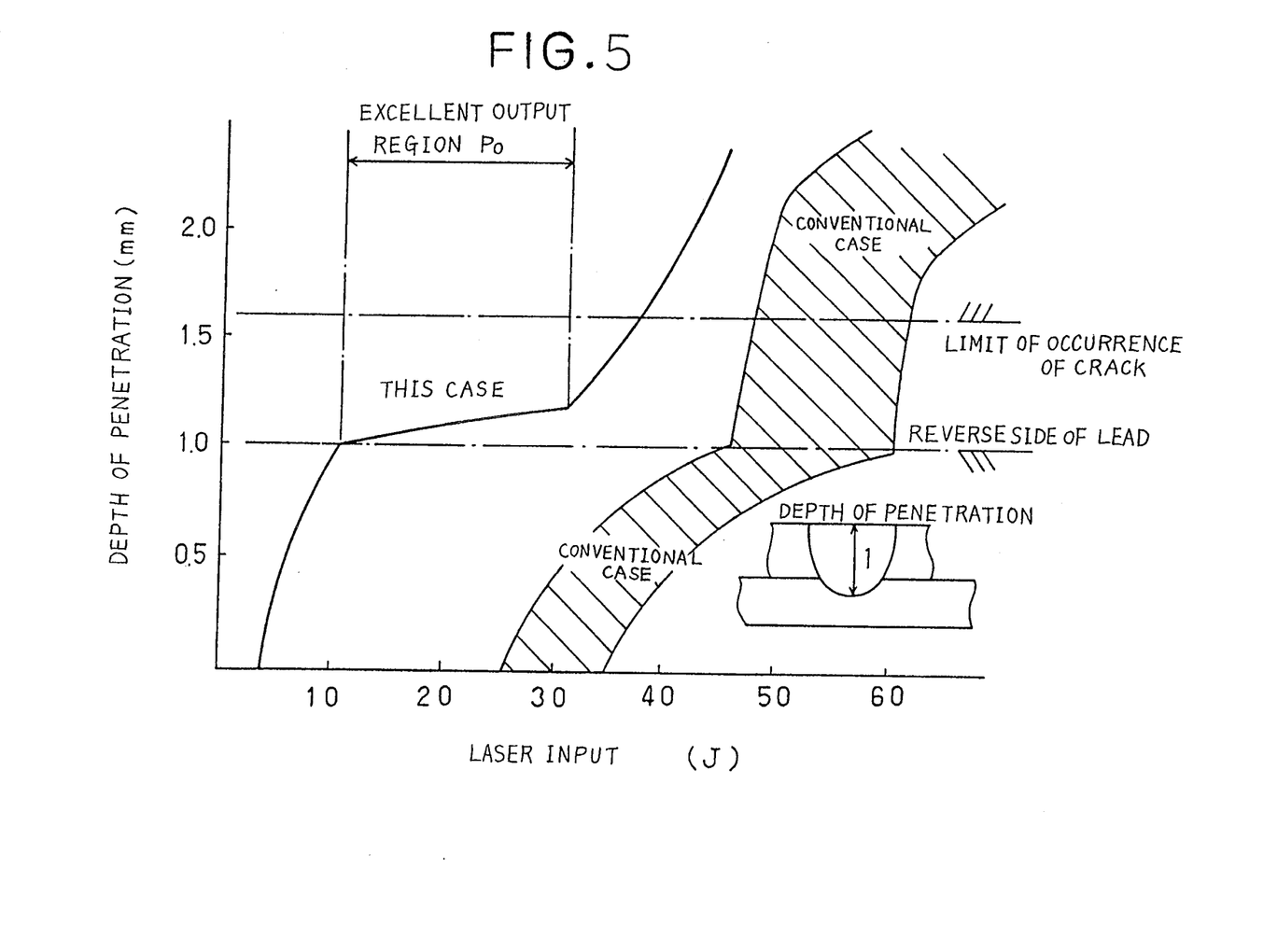
FIG. 5 is a characteristic diagram to explain the action.

Further, as shown in FIG. 5, a laser output range always stopping the progress of melt penetration at the aforementioned boundary did not exist conventionally. However, according to the action of the invention, penetration conducted on the boundary can be always stopped in a laser output range (P0 in FIG. 5) which can be fully put into practical use, making it possible to prevent the occurrence of cracks.

This second embodiment is especially effective in a case where the laser reflection factor of the lead 1 is not less than twice that of the terminal 3, and in a case where a metal such as mild steel, an iron-nickel alloy (for embodiment, an alloy of 42% nickel-52% iron) which tends to cause cracks when melted and mixed together with copper of the lead 1, is utilized for the material of the terminal 3. When the metals of the aforementioned combination are melted and mixed in the process of welding, an intermetallic compound is generated and a partial segregation is caused, so that cracks tend to occur in the welded zone. In order to solve the aforementioned problem, it is important to maintain the ratio of the amount of metal component of one of the welding metals contained in another metal, in a stable region. However, it is difficult to maintain depth (shown in FIG. 5) of penetration 1 constant. In the case of the second embodiment, the aforementioned difficulty can be avoided.

Figure 9:
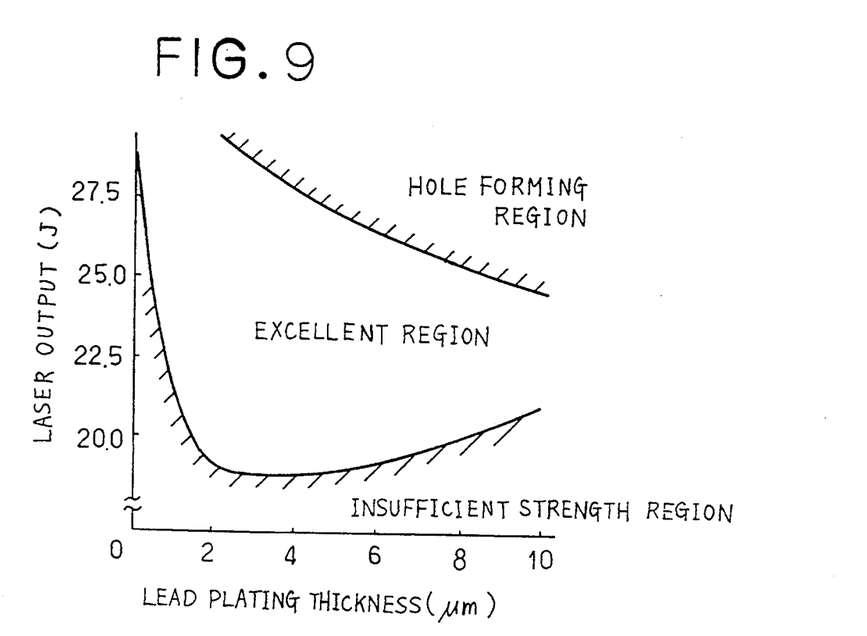
FIG. 9 is a characteristic diagram showing a good condition between the thickness of a deposition formed on the first metal layer and the peak output of lasers.
Figure 10:
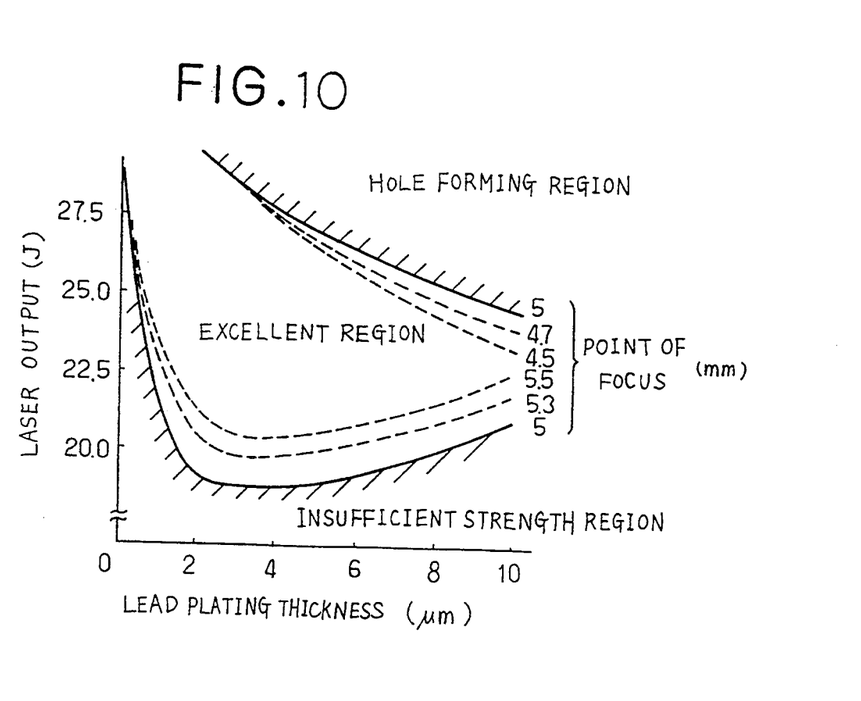
FIG. 10 is a characteristic diagram which includes the characteristic shown in FIG. 9 and the characteristic in which the point of the focus of lasers is changed.
Figure 11:
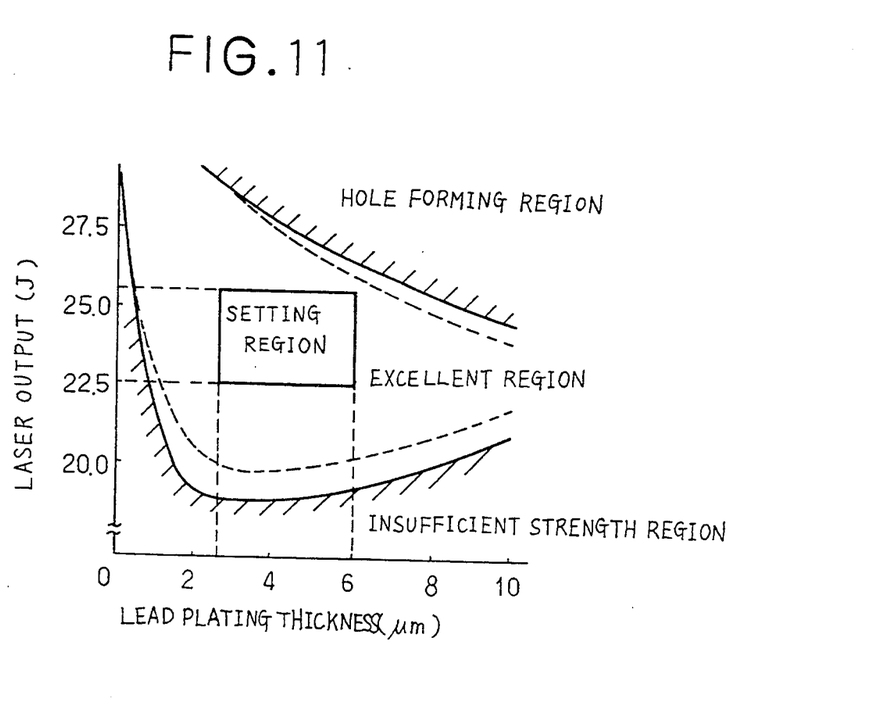
FIG. 11 is a characteristic diagram showing good conditions of peak output of lasers, the point of focus of lasers, and the thickness of a plating formed on the first metal member.

Referring now to FIGS. 9-11, suitable conditions of the laser output, the point of focus of lasers and the thickness of the metal layer formed on the first metal member, will be explained here below.

FIG. 9 is a characteristic diagram showing a suitable relation between the thickness of a tin deposit and the laser output in the case where the first metal member is a copper lead and the second metal member is a brass terminal respectively, and the lead is plated with tin and the terminal is plated with phosphor-nickel. These characteristics were obtained as follows:

Lasers of different output were irradiated from the side of the copper lead on which a tin plating of predetermined thickness was formed, and laser output in the case where a good joint condition was obtained, was experimentally found. The aforementioned operation was conducted in the same manner in the case of different thickness of tin plating.

A hole forming region in the drawing shows a region of condition in which a hole was formed in the lead when the lead metal was scattered. A strength lacking region in the drawing shows a region of condition in which the scatter was not caused, however, a satisfactory joint condition was not obtained due to insufficient laser output. The point of focus of lasers was fixed at a position located 5 mm apart from the reference surface (0) of the tin plating in the direction of the copper lead. In this case, the irradiating area of lasers on the tin-plated surface was a circle, having a diameter of 0.8 mm.

Next, FIG. 10 is a characteristic diagram obtained in an experiment made in the same manner as described above, wherein the point of focus of lasers being fixed in the case of FIG. 9, was changed. In the drawing, a solid line shows the same characteristic as that shown in FIG. 9, and a broken line shows a characteristic in which the point of focus of lasers was changed. This drawing shows that: when the point of focus of lasers is made shallow and the irradiating area on the tin-plated surface is reduced, the hole forming region expands; on the contrary, when the point of focus of lasers is made deep, the insufficient strength region is expanded.

FIG. 11 is a characteristic diagram made by considering the characteristics shown in FIGS. 9 and 10, which shows the suitable conditions of laser output, the point of focus of lasers and the thickness of the metal layer formed on the first metal member to obtain a good weld joint. The suitable conditions (the setting regions) obtained in this embodiment were as follows: the laser output range was 22.5–25.5 (J); the range of the point of focus was 4.7–5.3 (mm); and the range of thickness of the tin was 2.5–6.0 ($\mu$m).

With regard to the phosphor-nickel plating provided on the brass terminal, the same characteristic as shown in FIG. 9 could be also obtained, and its suitable condition (the range of thickness of the phosphor-nickel plating) was 1.5–5.0 ($\mu$m).

As explained above, according to the method for laser welding of different kinds of metals of the present invention, the metals can be welded excellently in such a manner that the first metal member of high laser reflection factor is irradiated with lasers of approximately constant output so that the second metal member of low laser reflection factor is not scattered. Therefore, it is not necessary to control laser input in accordance with the melting condition of the metal, so that the structure of an oscillator and jig can be simplified.

Figure 4:
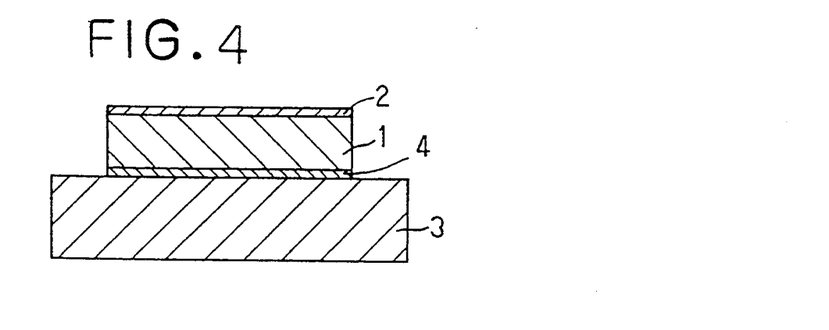
FIG. 4 is a sectional view showing another embodiment.

The same effect can be obtained in the case shown in FIG. 4 in which: the metal layer 2 is provided on the first surface 11 of the first metal member 1; the metal layer 4 is provided on the second surface 12 of the first metal member 1; the second surface 12 of the first metal member 1 is put on top of the surface 31 of the second metal member 3; and the first surface 11 of the first metal member 1 is irradiated with lasers. That is, the metal layer may be provided only in a portion which is melted by lasers.

Figures 6A, 6B, 6C:
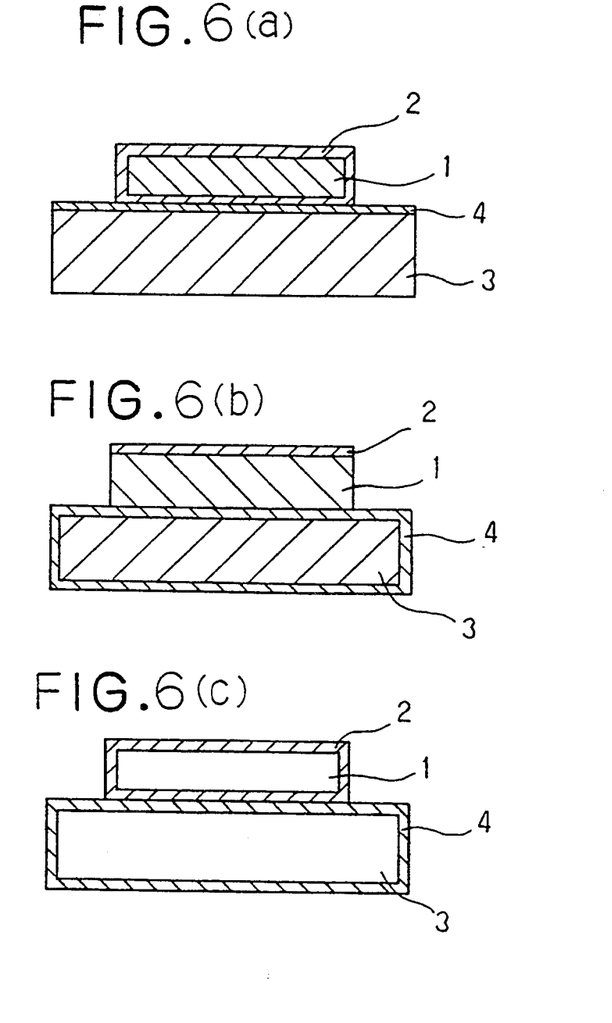

Also as it is necessary to provide a masking in order to partially form the metal layer 2 in a specific position on the first metal member 1 as shown in FIG. 1, and also in order to partially form the metal layer 4 in a specific position on the second metal member 3 by means of plating or coating which is troublesome In the metal layer 2 may be provided on all the surface of the metal member 1, and the metal layer 4 may be provided on all the surface of the metal member 3 as shown in FIGS. 6(a)–6(c). When all the surfaces of the first and the second metal member are coated with the metal layers, the metal layer provided on the first metal member becomes superposed on the metal layer provided on the second metal member. According to the various metal layers shown in the first embodiment, the joint strength is effectively improved by the wetting property between these metal layers.

In the first and second embodiment described above, cases of the metal layer being provided on two portions were shown. The metal layer on the surface of the first metal member was provided for the purpose of increasing laser absorption by copper, as widely known. On the other hand, even when a metal of relatively high laser absorption factors, for embodiment, phosphor-bronze (laser absorption factors: 22%) is utilized for the first metal member, and when only a phosphor-nickel plating is provided as a metal layer between the first metal member and the terminal of brass, in other words, even when the metal layer is provided only between the first and the second metal member, the same effect can be obtained.

Laser reflection factors of metal members shown in this embodiment are those of YAG lasers (the wavelength: 1.06 mm), and the effects described were those when the aforementioned metals were welded by YAG lasers. However, it should be understood that the present invention is not limited to the specific embodiments in which YAG lasers are utilized. That is, in the case where lasers having wavelength which satisfies the relation of laser reflection factor shown in the present invention, (0.8–1.5 $\mu$m) are utilized, the same effect as the case in which YAG lasers are utilized, can be obtained.

INDUSTRIAL APPLICABILITY

As mentioned above, according to the method for laser welding of different kinds of metals of the present invention, an excellent joint condition can be securely obtained, therefore it is superior in reliability to the conventional manual joining method in which solder is used. Further, according to the welding method of the invention, when a terminal on an IC board used for electric appliances is connected through a lead with a terminal installed in a case in which an IC board is placed, the joining operation can be automated, so that the method of the invention is very effective when different kinds of metals are welded.

We claim:

1. A method of welding metals of different kind by laser, comprising the steps of:

putting a first metal member having a first laser reflection factor on top of a second metal member having a second laser reflection factor lower than the first laser reflection factor, through a metal layer which is more difficult to melt than the second metal member and prevents energy of said laser from being abruptly inputted into the second metal member; and irradiating a laser output onto a side of said first metal member to form an alloy consisting of said first metal member, said metal layer, and said second metal member and extending across said first metal member, said metal layer and said second metal member so that said first member is welded to said second metal member.

2. The method of welding metals of different kind by laser, comprising the steps of:

putting a first metal member having a first laser reflection factor on top of a second metal member having a second laser reflection factor lower than the first laser reflection factor, through a metal layer which is more difficult to melt than the second metal member; and irradiating a laser output onto a side of said first metal member to weld said first metal member to said second metal member, the laser reflection factor of said metal layer being approximately the same as that of said second metal number, and the melting point of said metal layer being higher than that of said second metal member.

3. The method of welding metals of different kind by laser, comprising the steps of:

putting a first metal member having a first laser reflection factor on top of a second metal member having a second laser reflection factor lower than the first laser reflection factor, through a metal layer which is more difficult to melt than the second metal member; and irradiating a laser output onto a side of said first metal member to weld said first metal member to said second metal member, the laser reflection factor of said metal layer being between the laser reflection factor of said first metal member and that of said second metal member.

4. The method of welding metals of different kind by laser according to claim 2 or claim 3, wherein said metal layer is formed on said second metal member between said first and said second metal member by means of plating.

5. The method of welding metals of different kind by laser according to claim 2 or claim 3, wherein said metal layer is formed on said first metal member between said first and said second metal member by means of plating.

6. A method of welding metals of different kind by laser by which at least two kinds of metal members having mutually different laser reflection factors, are put one upon another and welded by irradiating with lasers in a superposing direction to the surface of said metal members, comprising the steps of:

superposing a first metal member on a second metal member, wherein said first metal member includes first and second surfaces opposed to each other, said first metal member having a first laser reflection factor, providing a first metal layer having a laser reflection factor lower than said first laser reflection factor on said first surface of said first metal member, said second metal member having a second laser reflection factor lower than said first laser reflection factor, putting said second metal member on said second surface of said first metal member through a second metal layer being approximately the same as that of said second metal member, and the melting point of said second metal layer being higher than that of said second metal member, and irradiating a laser output from a side of said first metal layer which is provided on said first surface of said first metal member to weld said first metal member to said second metal member.

7. The method of welding metals of different kind by laser according to claim 6, wherein said first metal member is made of copper, said first metal layer provided on said first surface of said first metal member is made of tin, said second metal member is made of brass, and said second metal layer, the melting point of which is higher than that of said second metal member, is made of a phosphor-nickel alloy.

8. A method of welding metals of different kind by laser by which at least two different kinds of metal members are placed on each other and welded when said metal members are irradiated with lasers emitted in a direction perpendicular to the surface of said metal members, comprising the steps of:

putting a first metal member on a second metal member, wherein said first metal member includes first and second surfaces opposed to each other, said first metal member has a first laser reflection factor, providing a first metal layer having a laser reflection factor lower than said first laser reflection factor on said first surface of said first metal member, said second member having a second laser reflection factor lower than said first laser reflection factor, putting said second metal member on said second surface of said first metal member through a second metal layer, the laser reflection factor of said second metal layer being between the laser reflection factor of said first metal member and that of said second metal member; and irradiating a laser output from a side of said first metal layer which is provided upon said first surface of said first metal member to weld said first metal member to said second metal member.

9. The method of welding metals of different kind by laser according to claim 8, wherein the difference of laser reflection factor between said first and said second metal member is larger than the difference of laser reflection factor between said second metal member and said second metal layer located between said first and said second metal member.

10. The method of welding metals of different kind by laser according to claim 8, wherein said second metal layer, the laser reflection factor of which is between the laser reflection factor of said first metal member and that of said second metal member, has a melting point higher than that of said second metal member.

11. The method of welding metals of different kind by laser according to claim 8, wherein said first metal member is made of copper, said first metal layer provided on said first surface of said first metal member is made of tin, said second metal member is made of iron or an iron alloy, and said metal layer, the laser reflection factor of which is between the laser reflection factor of said first second metal member and that of said second metal member, is made of nickel or a nickel-iron alloy.

* * * * *